(12) United States Patent
Nijim et al.

(10) Patent No.: US 9,292,174 B1
(45) Date of Patent: Mar. 22, 2016

(54) CONTENT CHECK-IN

(71) Applicant: Cox Communications, Inc., Atlanta, GA (US)

(72) Inventors: Yousef Wasef Nijim, Roswell, GA (US); Jay Paul Langa, Cumming, GA (US); James Alan Strothmann, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 153 days.

(21) Appl. No.: 14/067,094

(22) Filed: Oct. 30, 2013

(51) Int. Cl.
*G06F 3/00* (2006.01)
*G06F 3/0482* (2013.01)
*H04L 12/58* (2006.01)

(52) U.S. Cl.
CPC ............ *G06F 3/0482* (2013.01); *H04L 12/588* (2013.01)

(58) Field of Classification Search
CPC .................................................. H04L 12/588
USPC ........................................................ 715/719
See application file for complete search history.

(56) References Cited

U.S. PATENT DOCUMENTS

| | | | |
|---|---|---|---|
| 8,994,716 B2* | 3/2015 | Malik | 345/419 |
| 9,043,329 B1* | 5/2015 | Patton et al. | 707/740 |
| 9,047,350 B2* | 6/2015 | Young et al. | |
| 2006/0080702 A1* | 4/2006 | Diez et al. | 725/30 |
| 2006/0218225 A1* | 9/2006 | Hee Voon et al. | 709/201 |
| 2007/0130580 A1* | 6/2007 | Covell et al. | 725/18 |
| 2007/0150603 A1* | 6/2007 | Crull et al. | 709/227 |
| 2008/0059986 A1* | 3/2008 | Kalinowski et al. | 725/1 |
| 2008/0222295 A1* | 9/2008 | Robinson et al. | 709/227 |
| 2008/0229215 A1* | 9/2008 | Baron et al. | 715/751 |
| 2013/0073388 A1* | 3/2013 | Heath | G06Q 50/01 705/14.53 |
| 2013/0073624 A1* | 3/2013 | Nguyen et al. | 709/204 |
| 2014/0006129 A1* | 1/2014 | Heath | G06Q 30/0222 705/14.23 |

* cited by examiner

*Primary Examiner* — William Titcomb
(74) *Attorney, Agent, or Firm* — Merchant & Gould

(57) ABSTRACT

Content check-in may be provided. Users may be able to check-in a video content item that he/she may be currently viewing or that he/she may view later such that the checked-in content item may be shared with one or more contacts. The user may provide information for one or more contacts to allow for an analysis of available viewing options for the checked-in content item that may be offered to selected contacts based on the viewing location and service provider(s) associated with the selected contacts.

20 Claims, 11 Drawing Sheets

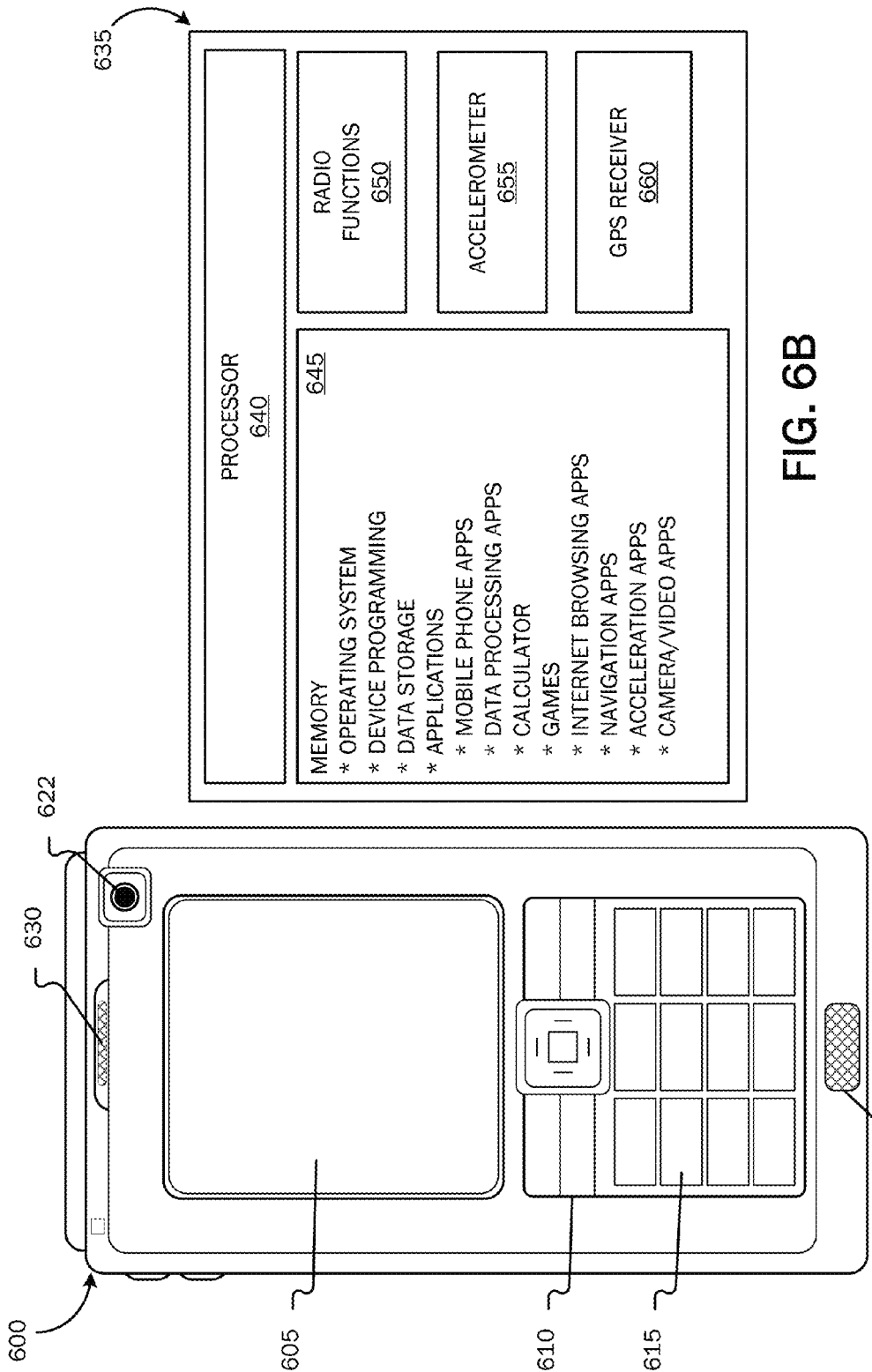

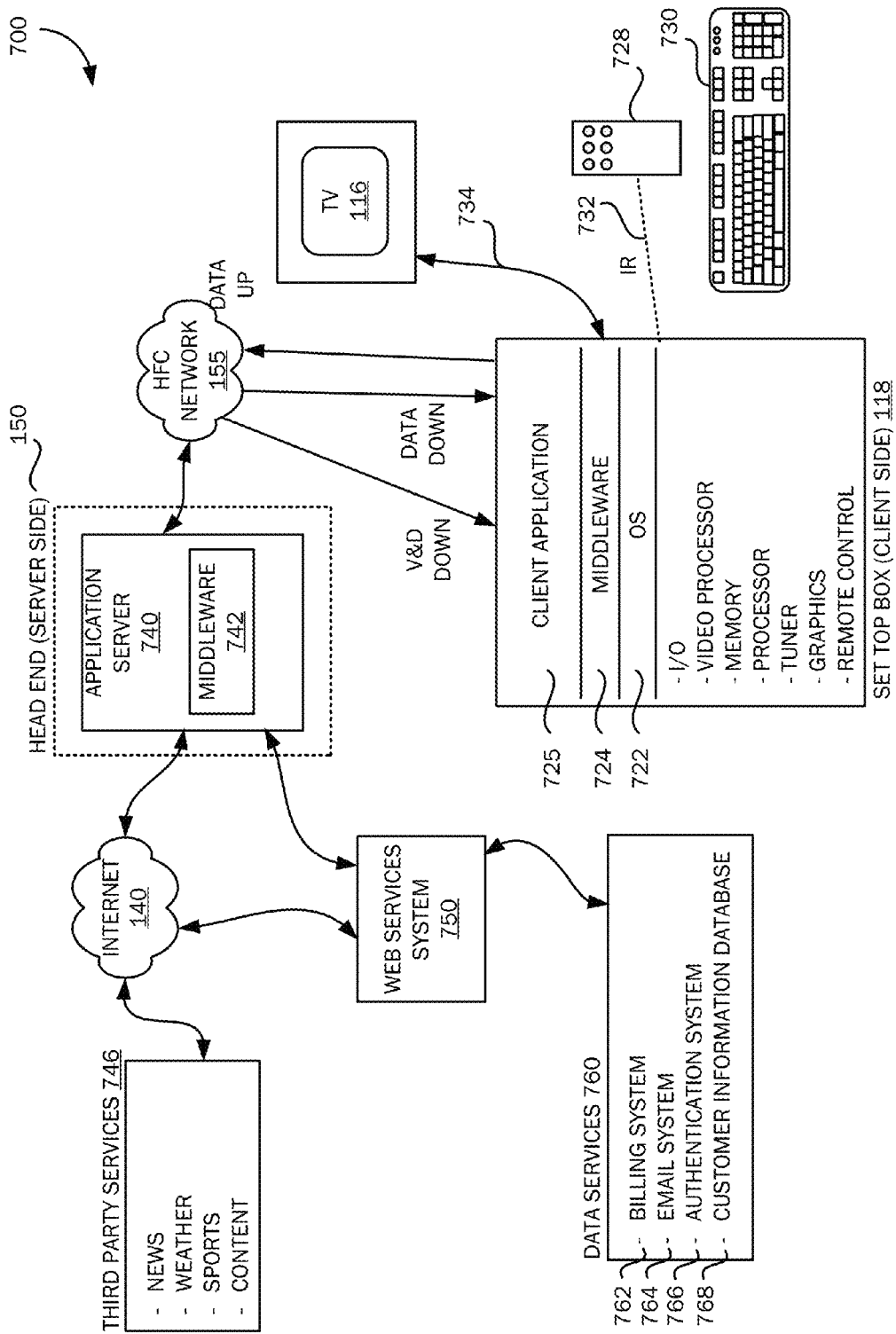

CONTENT CHECK-IN

BACKGROUND

Many viewers of performances, whether live or broadcast, and perhaps especially viewers of films and television shows enjoy sharing with each other when and what they are viewing. As individuals' lives have become busier and as family and friends have become more dispersed from a single geographic area, in modern times, opportunities for communal viewing have decreased, and more video content is being viewed independently and individually. Additionally, video content viewing is often time-shifted, for example, via the use of digital video recorders (DVRs) and consumption of video on demand (VOD) content, and thus, users may not view video content at the same time. Further, such users may have different service providers who may offer viewings at a different time on a different channel altogether.

A variety of attempts have been made by various social networks or social television aggregators to provide assorted types of "live chat" experiences during television programs or other broadcast events. Although such solutions may help to enable users in remote locations to make comments while they view a same show, the users may be restricted to simultaneous viewing of video content. As can be appreciated, simultaneous viewing of video content, especially by users who are located in different time zones, may be challenging, and "live chat" in time-shifted content may not be provided especially when the video is provided by different providers through different channels.

Although users may be less likely or less able to communally view video content due to location and timing constraints, the desire for shared viewing experiences still exists. It is with respect to these and other considerations that the present invention has been made.

SUMMARY

Embodiments of the present invention solve the above and other problems by providing content check-in. According to embodiments, users of video content may be enabled to check-in the content they are viewing on their viewing device so as to share the content that they may be viewing with their various contacts. The users' contacts may receive an indication via a social network of the content that has been viewed by the user and details regarding how they may access the same content based on their viewing location and their service provider.

According to embodiments, a user may be able to check-in the content that he/she is currently viewing or the content that he/she may view later on his/her viewing device. The user may share his/her social network contacts' information in order to accurately analyze the viewing options that may be available for the selected contact(s) based on their viewing location and content provider. The content may be checked-in, and accordingly, a contact/group of contacts in the user's social network may receive an indication of a specific content item the user is currently viewing or will view along with the viewing options for the contact(s) to view the checked-in video content item based on their viewing location and content provider. The indication may include timings and channels that may be available for viewing the checked-in content.

When a user uses the "content check-in" with a selective community of contacts (e.g., friends), the contacts may receive information on how they may view the content based on their viewing location and their service provider. Contacts may respond back with specific information about their viewing location, as well as, their service provider in order to receive more accurate available viewing options of the checked-in video content item.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout:

FIG. 2C is an illustration of a user-interface for providing first time setup for check-in content check-in;

FIGS. 3A and 3B are illustrations of examples of user-interfaces to facilitate content check-in;

FIGS. 6A-6B illustrate a suitable mobile computing environment with which embodiments may be practiced; and FIG. 7 is a simplified block diagram illustrating a cable television services system architecture providing an operating environment according to an embodiment.

DETAILED DESCRIPTION

Figure 1:
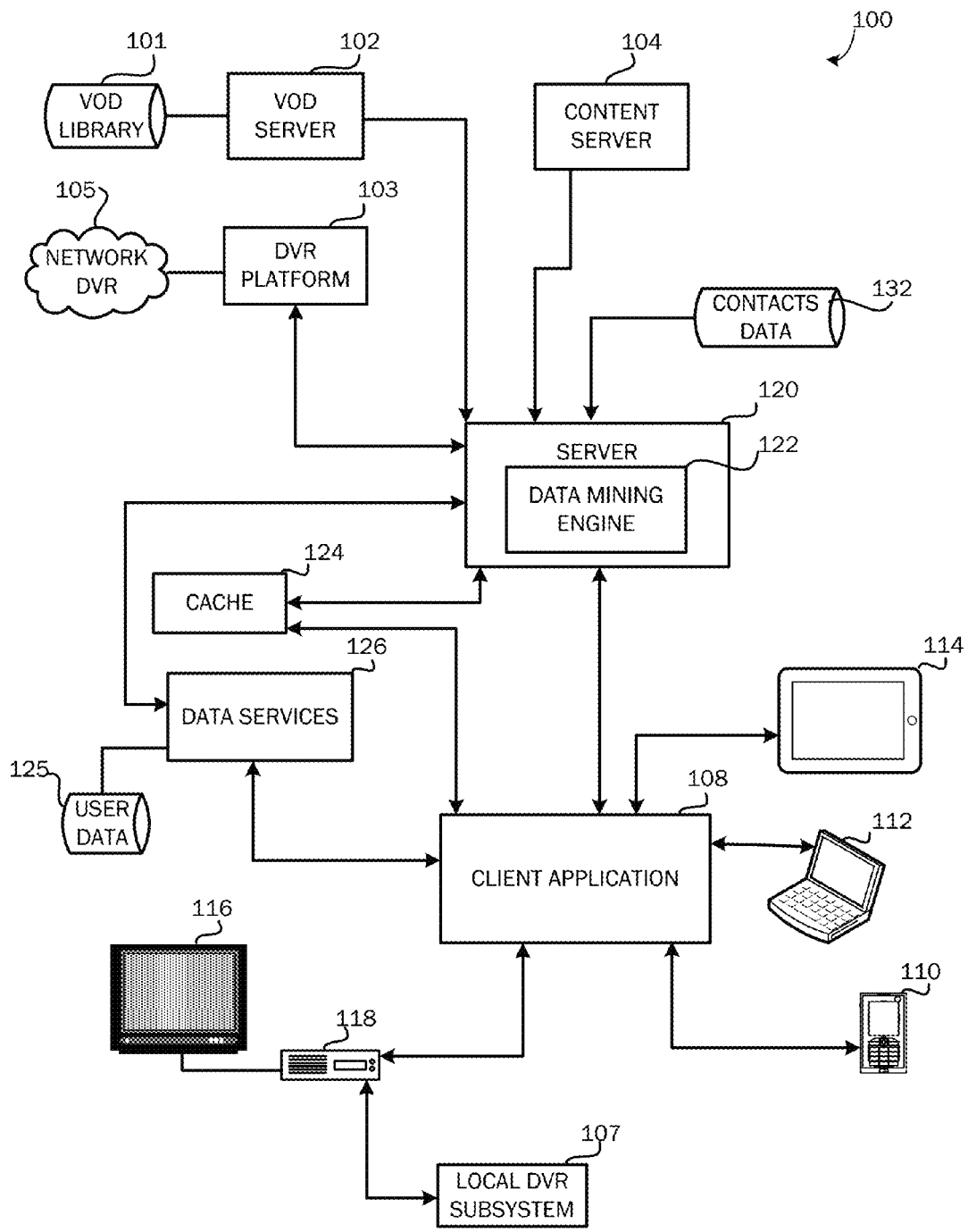
FIG. 1 is a simplified block diagram illustrating a system for providing content check-in for video content.

As briefly described above, embodiments of the present invention provide content check-in. According to embodiments, a user may be able to check-in a content item that he/she may be viewing on a viewing device. For example, the user may be in a specific location (e.g., city) where he/she may be viewing a content item on his/her device that the user would like to share with one or more of the user's social network contact(s). The contact(s) may be situated in another location which may be geographically in a different time zone and may have service via one or more different service providers.

Embodiments of the invention provide for collecting the user's social network contact(s) data, analyzing the user's social network contact(s)' location and service provider information and providing an indication via available and suitable means to the social network contact(s) regarding the available viewing options for the checked-in content. The level of accuracy of the analysis and presented viewing options may be based on the level of information shared by the user about the social network contact(s). According to an embodiment, the user may be able to check-in a content item that may be scheduled for presentation at a later time. The indication provided to the social network contact(s) may include timings and channels that the checked-in content may be available for viewing.

Embodiments may not be limited to social network contact content sharing, but may be utilized in various other contexts. For example, embodiments may be utilized in an educational setting where instructors or students may want to share a content item related to their curriculum, or in a business setting where business users may want to share a piece of content that may be broadcast for commercial purposes.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram of a system 100 for providing content check-in. Components of the system 100 may operate as a distributed system where each component is accessed via a suitable network, or the components may operate together as an integrated system. As illustrated, content server 104, network DVR platform 103, local DVR subsystem 107, VOD server 102 and contacts data 132 may be provided. Content server 104 may include video content data and metadata available via a service provider, such as cable television (CATV) services system (as illustrated and described below with reference to FIG. 7), satellite television provider, or a provider on the Internet such as YouTube®, Hulu®, etc. The data and metadata may include information such as video content title, storyline, cast, genre, rating, release date, images, etc.

Contacts data 132 may comprise data and metadata related to the user's social network contacts which may include information about the social network contacts' viewing locations, viewing devices, service provider(s), etc.

Network DVR platform 103 may comprise various DVR recordings or pointers to various DVR recordings recorded on a network DVR 105 that may be available for viewing to the user. DVR recordings may also be stored locally via a local DVR subsystem 107 connected to a set-top box 118 in communication with a TV 116.

VOD server 102 may provide access to various VOD content items, stored either within the VOD library 101 maintained by the content provider, or the VOD content that may be available via the Internet. VOD server 102, network DVR platform 103 and content server 104 may be provided to a server 120 where a data mining engine 122 may be operable to analyze the data and metadata to provide an indication via available and suitable means to the user's social network contact(s) regarding the available viewing options for the checked-in content. The associated channel/guide/content/contacts data may be cached. The cache 124 is illustrated in FIG. 1 as a remote element, but may be integrated with the server 120 or the client application 108. As new information becomes available, the associated channel/guide/content/contacts data may be updated in the cache 124.

The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data.

As illustrated in FIG. 1, various endpoint devices may be utilized to access video content. For example, endpoint devices may include, but are not limited to, a mobile communication device 110, such as a mobile phone, a computing device 112, such as a desktop computer, a laptop computer, etc., a wireless computing device, such as a tablet computing device 114, a television 116, such as an Internet-connected television or a television connected to a network-connected device, such as a set top box (STB) 118. An endpoint device 110,112,114,116 may be utilized to access a client application 108.

The client application 108 may be operable to receive a request from a user for initiating the check-in for a content item that may be shared with a contact or a group of contacts from their social network and an indication may be displayed and rendered on the selected user's social network contacts' viewing device through their social network application etc. As should be appreciated, checking in a content item for sharing with one or more other users may include tagging or otherwise designating a content item for sharing with the one or more other users. In some instances, the tagged or designated content item may be provided to the one or more other users in real time or as a subsequently played content item that is streamed from a repository of stored content items. Where the contact(s) to whom the content item is shared are associated with a different service provider from the user checking in the content item, the content item may be provisioned to the contact(s) from a different service provider, or the content item may be shared between service providers such that the shared content item is passed from a first service provider associated with the user checking in the content item to a second service provider associated with a contact with whom the content item is shared.

A designated button or other selectable control on a remote control or other suitable hard or soft key selection device may be used to initiate content check-in based on availability. A secondary screen companion device such as a tablet or other hand held computing device with an associated content provision application may also be used to allow the request to check-in content that may be displayed on the viewing screen such as the television 116. Other suitable means for content check-in initiation includes touch command, voice command, gesture command and combinations of various functionality interface methods and systems.

The associated channel/guide/content data may be stored in a cache 124 located on the server 120, on the application 108, or may be located remotely and accessed via a network.

The device used by the social network contacts, receiving the indication of the available viewing options may include various types of devices such as a set-top box (STB), a computer, a tablet computing device, a mobile phone, a gaming device, a networked television, or other type of networked receiving and decoding device.

Figure 2A:
FIGS. 2A and 2B are illustrations of example content items for which the option to check-in content may be provided.

FIG. 2A is an illustration of an example of a full screen video viewing interface 200 providing an option for content check-in. According to embodiments and as illustrated in FIG. 2A, the check-in option 204 may be provided on full screen video display. When the check-in option 204 is selected from a full screen video viewing interface 200, the video content that the user may currently be viewing may be checked-in.

Figure 2B:
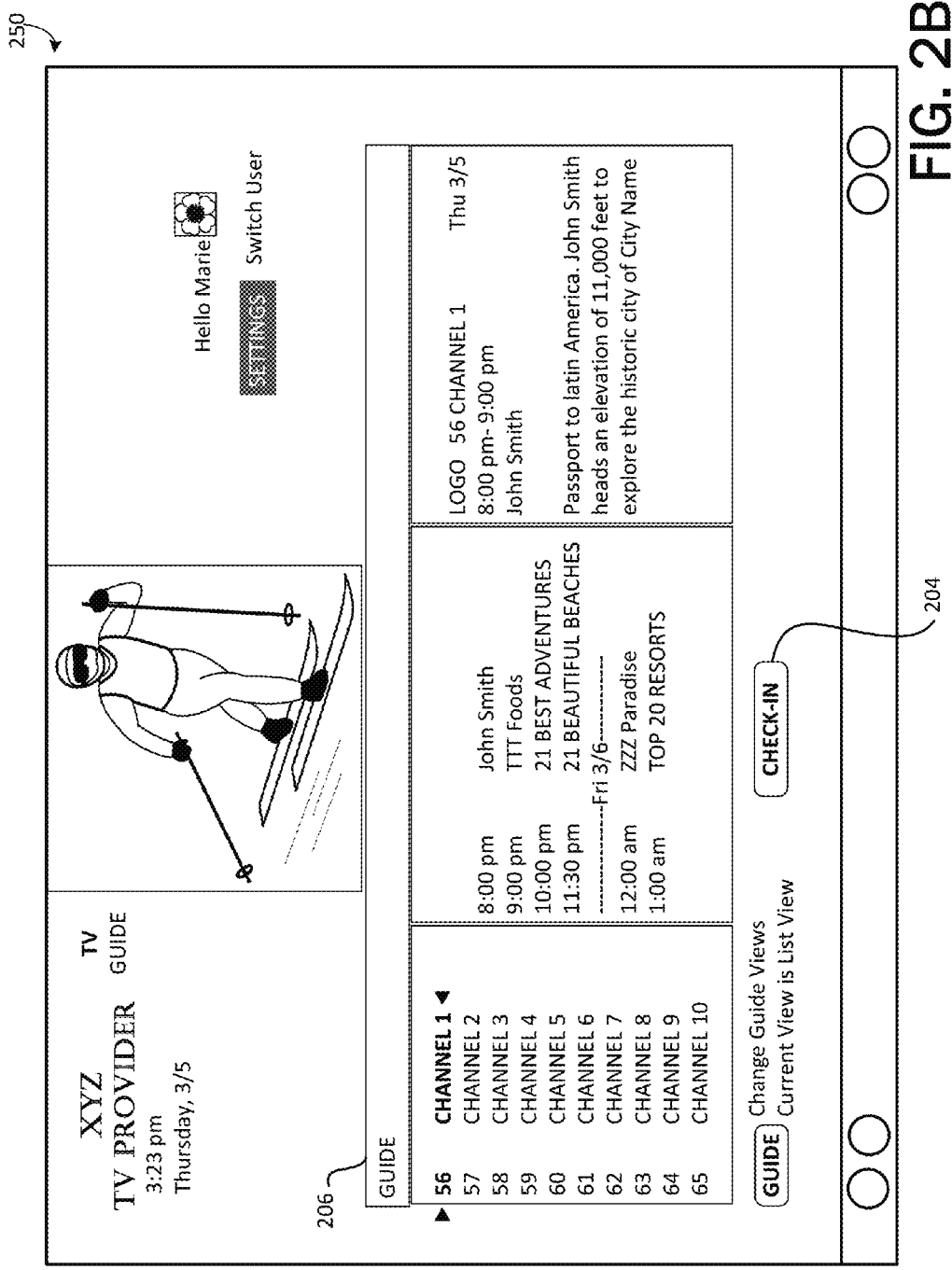

According to another embodiment and as illustrated in FIG. 2B, the video content may also be checked via the check-in option 204 overlaid on a guide user interface 250. If the user uses the check-in option 204 on the guide user interface 250, the user may be able to highlight a different content item on a different channel and then select the check-in option 204 in order for that specific content item to be checked-in.

The option to check in content may be implemented via a variety of different interfaces that includes, but is not limited to, a selectable icon on the full screen display 200 as illustrated in FIG. 2A, a selectable icon 206 on the guide user interface 250 as illustrated in FIG. 2B, voice activation, a gesture input, a button on a remote, a menu option, a banner, via an alternate device etc.

Figure 2C:
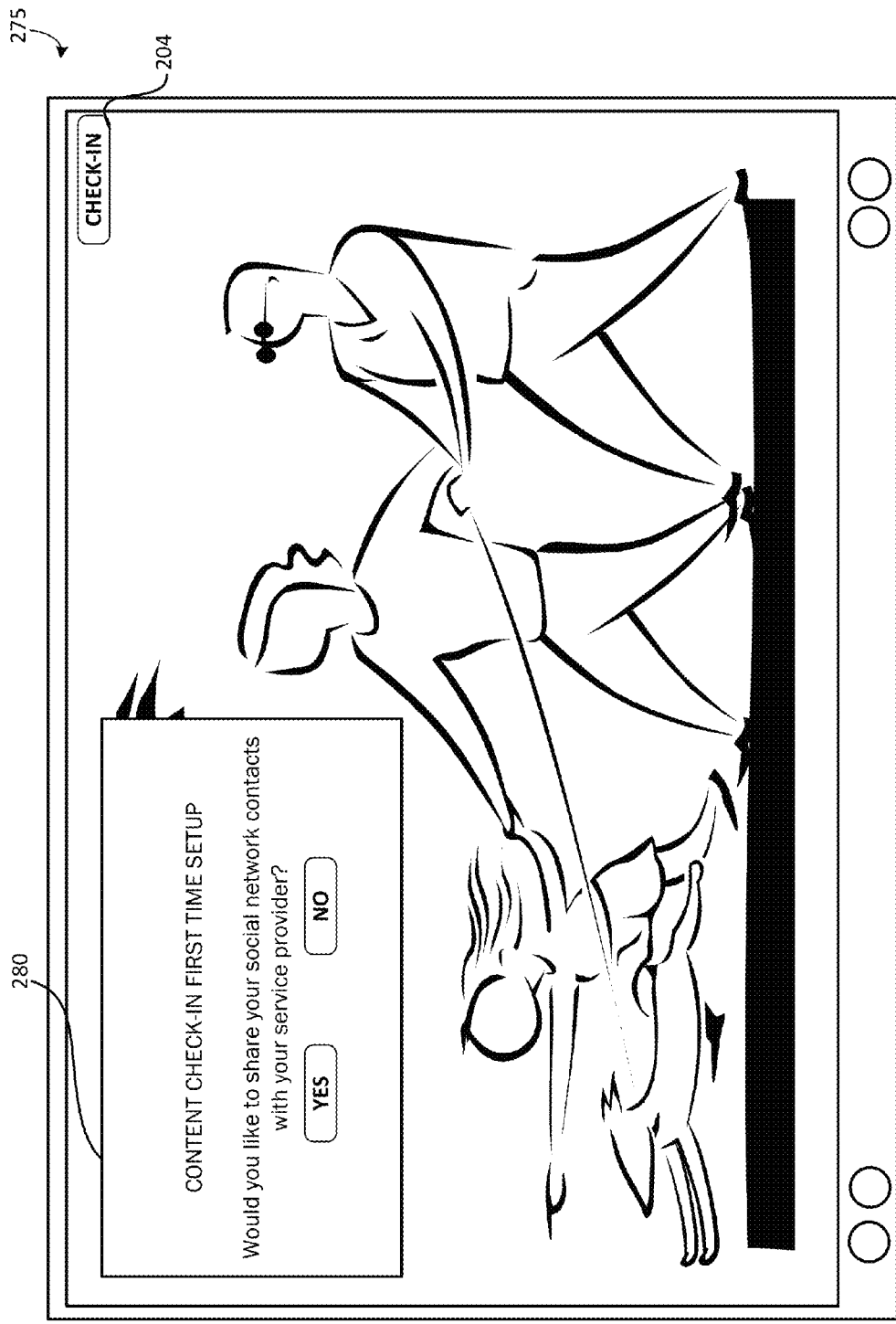

FIG. 2C is an illustration of a user-interface 275 providing a first time setup for checking in content. According to an embodiment, once the check-in is initiated via any of the above listed means, a pop up 280 as illustrated in FIG. 2C may be displayed on the user's viewing device. The user may provide permission to share the user's social network's contact(s) with the service provider.

Figure 3A:
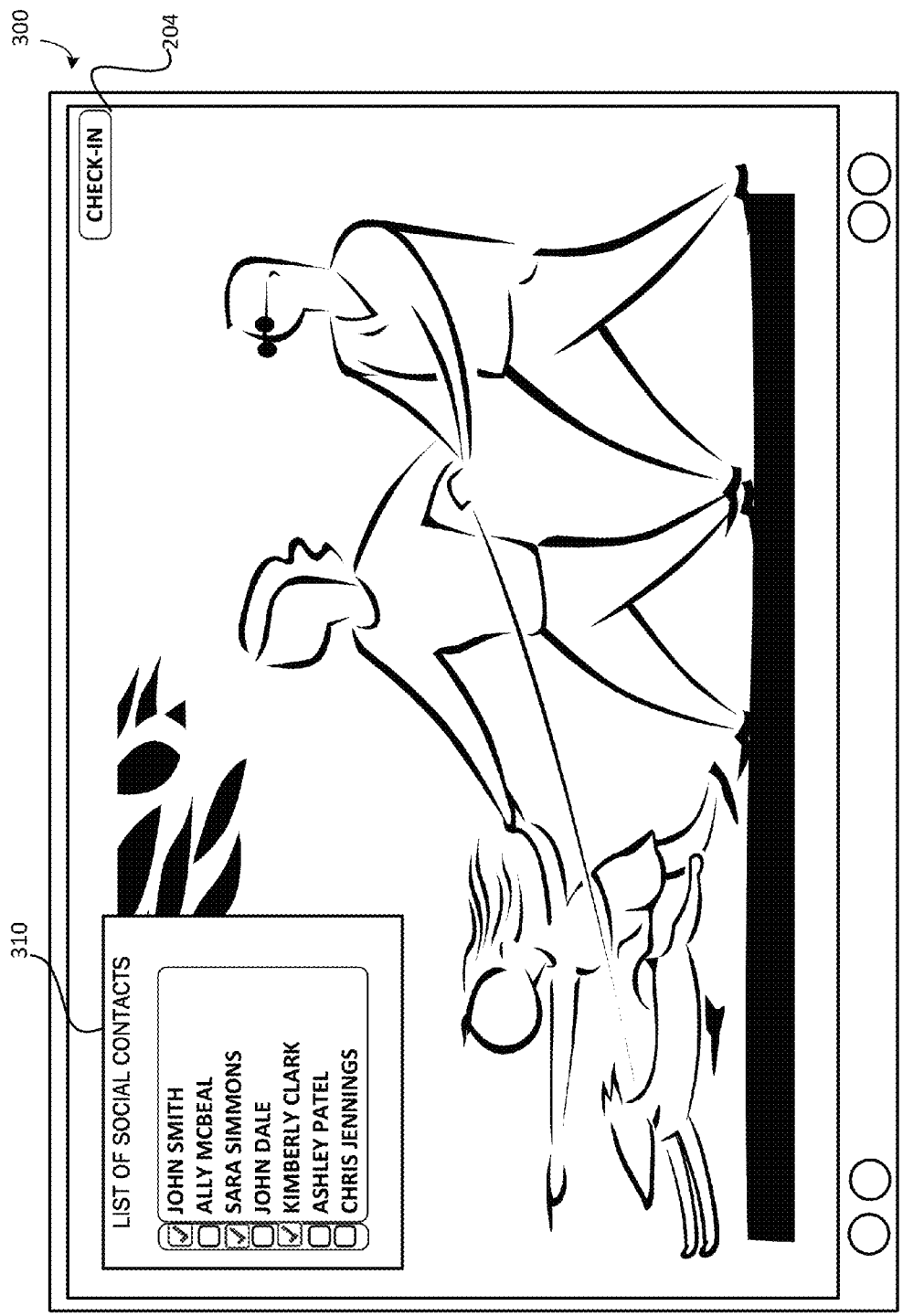

Once the service provider receives permission to access the user's social network contact(s), a list 310 may be provided to the user via a user interface 300 as illustrated in FIG. 3A. The list 310 may comprise a listing of the user's contact(s). The user may be able to select the contact(s) with whom the user may wish to share the checked-in content item. As should be appreciated, the term social network contacts used herein is not limited to one or more contacts of the checking-in user associated with a particular social network system or program, but is meant in a general sense to include any contacts available to the checking-in user to which the user may desire to provide viewing options for a checked-in content item.

Until this point the system may comprise general information for the user's social network contact(s)' location and service provider. For example, when the user agrees to share the user's social network contact(s)' information as illustrated in FIG. 2C, the service provider may be able to analyze general information about the location of the user's social network contact(s) and about the service providers that may provide service in that area. For example, if location information (e.g., address) is readily available for a given contact with whom checked-in content is to be shared, a service provider associated with the sharing user may be able to look up the time zone and service provider associated with the contact(s) with whom the content item will be shared. There may be cases where the user's social network contact(s) may reside in an area that may have multiple service providers. According to embodiments, in such cases, the system may be able to provide available viewing options of all of the service providers in the area and their programming content with the showing times in the indication to the user's social network contact(s). In such a scenario, the viewing options may be extensive.

Figure 3B:
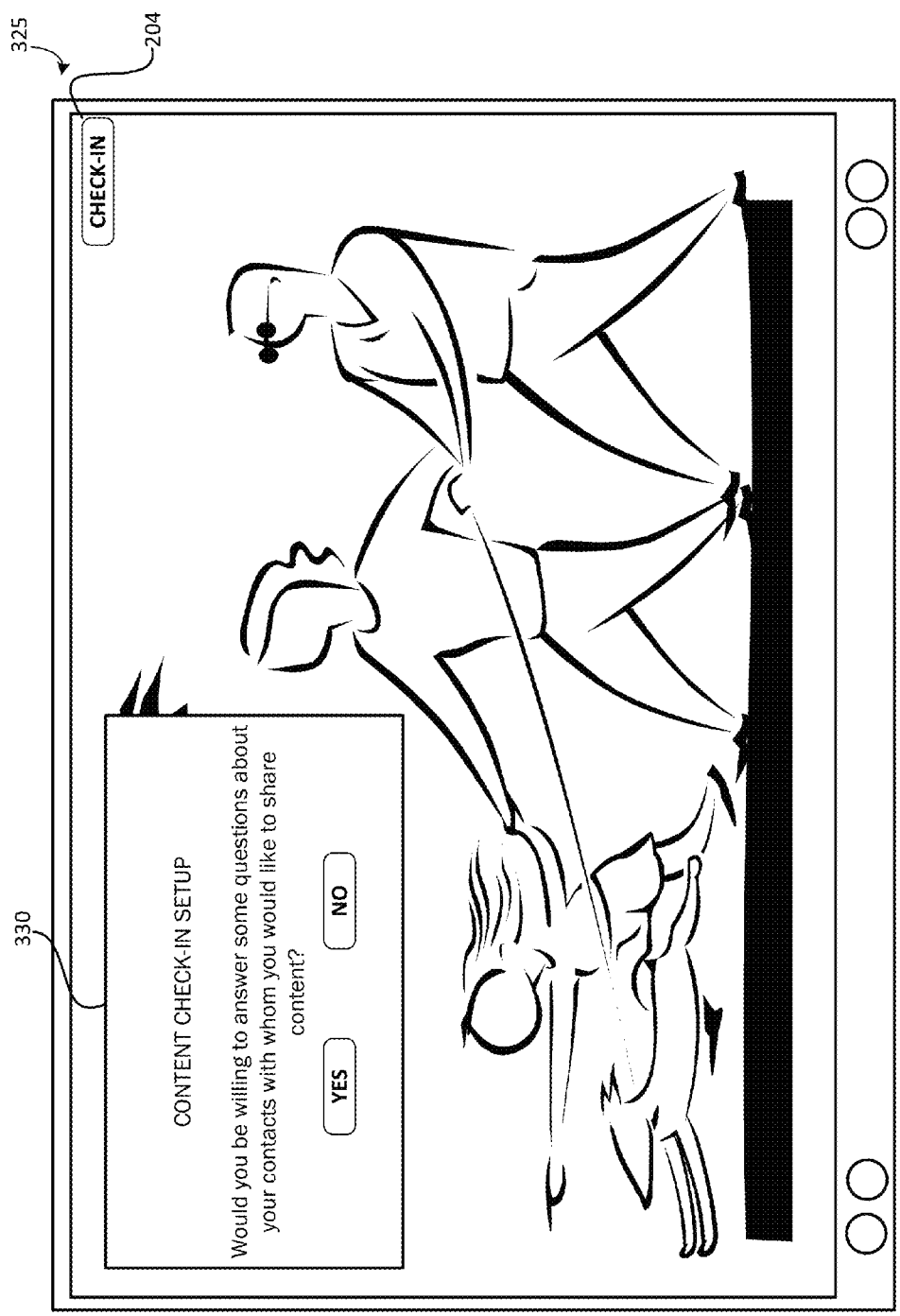

If location and service provider information is not readily available for given contact, the checking-in user may be able to provide more information about the location and/or service provider of the social network contact(s) to the service provider, and the viewing options may be narrowed down to provide the user's social network contact(s) with more accurate results of the available viewing options of the checked-in content. As illustrated in FIG. 3B, the user may be asked via a popup 330 in a user interface 325 if he/she has access to and is willing to provide additional information about the user's social network contact(s).

According to an embodiment, once the system performs the analysis about the available viewing options for the selected social network contact(s), prior to the indication provided to those social network contact(s), there may be communication between the user's service provider and the user's selected social network contact(s) regarding location and service provider of the selected social network contact(s). This may in turn provide the user's service provider with more information to narrow the viewing options that may be presented to the user's selected social network contact(s).

The additional questions that may be answered by the user as illustrated in FIG. 3B and the communication between the user's service provider and the user's social network contact(s) may serve the same purpose of providing the user's service provider with more information to accurately indicate the viewing option(s) for the checked-in content to the user's selected social network contact(s). There may be instances where the selected social network contact may reside in a particular location which may be provisioned by a particular service provider, but he/she may be visiting another location in another location (for example, on a vacation) which may be geographically separated and hence may be provisioned temporarily by a different service provider. This information may not be available on the social network, but may only be available to the user and/or to the user's social network contact(s).

As should be appreciated the user interface layouts and components illustrated in FIGS. 2A-3B are for purposes of illustration and example only and are not limiting of the vast number of different layouts and components that may be utilized in accordance with embodiments of the invention.

Figure 3C:
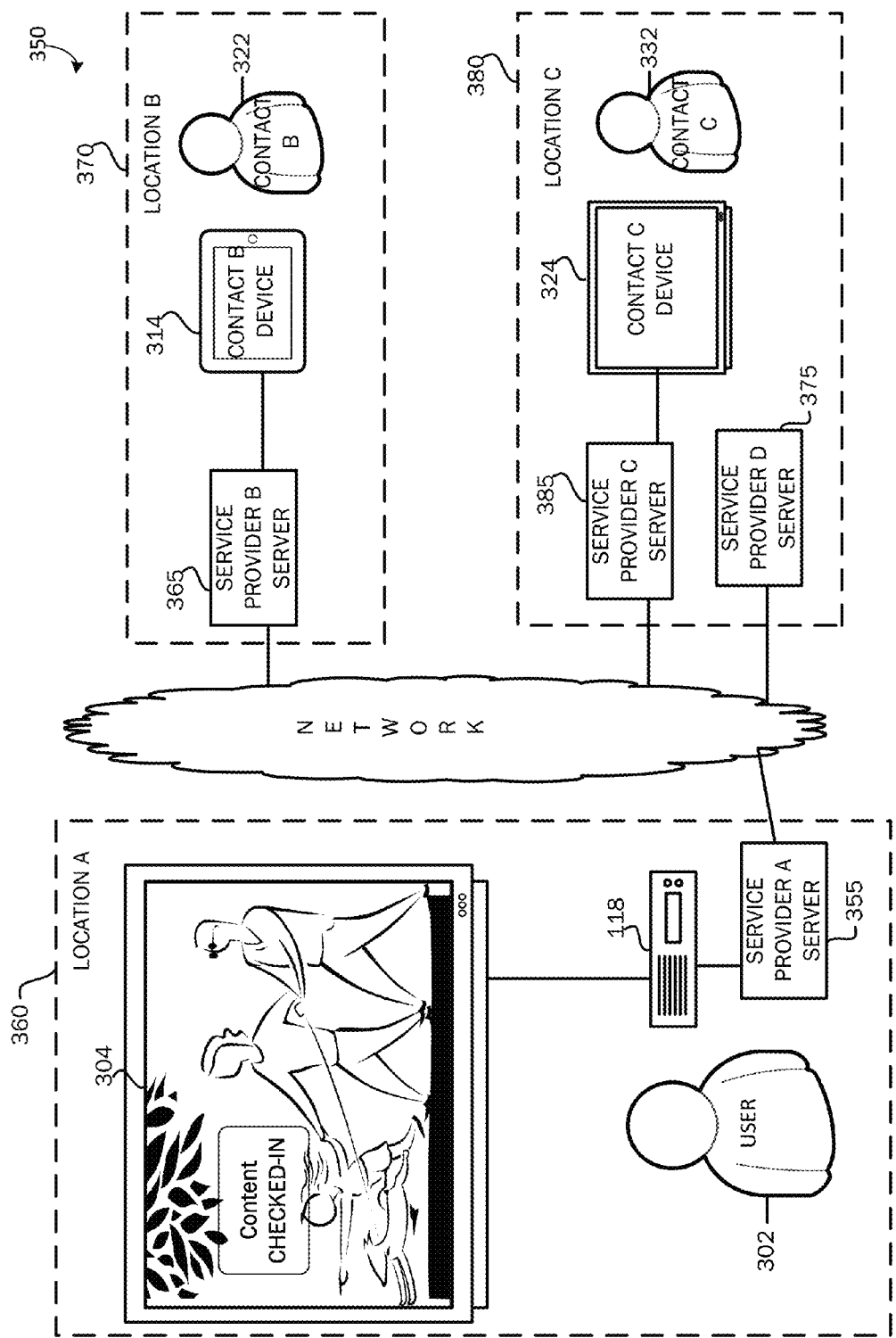
FIG. 3C is an illustration of a flow of content check-in according to an embodiment.
Figure 4:
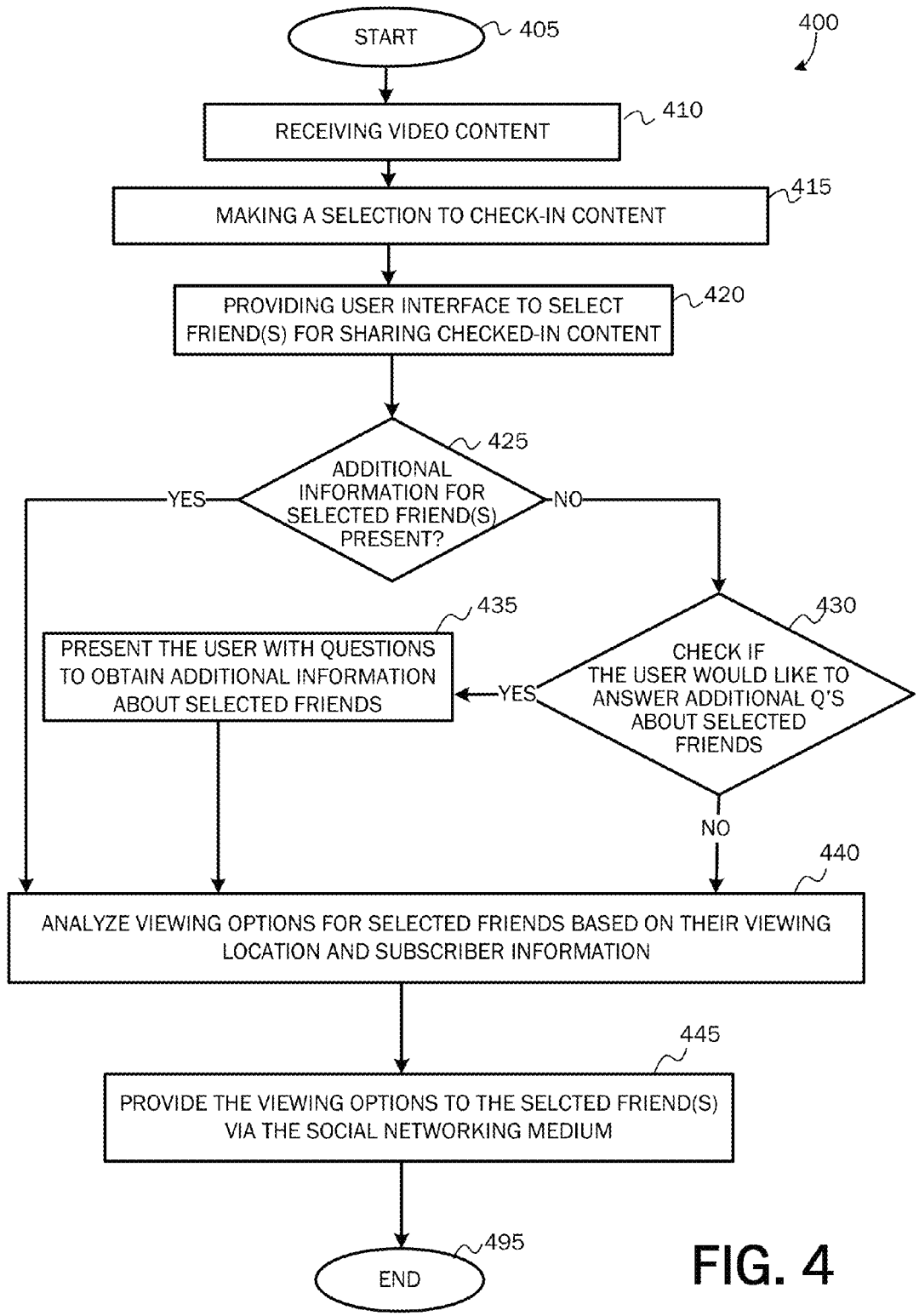
FIG. 4 is a flow chart of a method for providing content check-in according to an embodiment.

FIG. 3C provides an example flow 350 of how a user 302 located in a Location A 360 provisioned by a Service Provider A 355, may check in a content item 304 with Contact B 322 and Contact C 332 located in Location B 370 and Location C 380 respectively. The user 302 may check in a content item 304 via an application provided by his Service Provider A 355. The user 302 may choose to check in the content 304 via the check-in option 204 as illustrated in FIGS. 2A, 2B or via voice activation, a gesture input, a button on a remote, a menu option, a banner, via an alternate device, etc. Once the content is checked in, an analysis may be performed in order to provide an indication to Contact B 322 and Contact C 332 with the viewing options available to them for the checked-in content based on their respective locations, Location B 370 and Location C 380 and the service providers available in those locations.

In our example, as illustrated in FIG. 3C, the current location of the Contact B 322 and Contact B's Device 314 is Location B 370, and Service Provider B 365 is the only available service provider in that location. Therefore, in the analysis, the system may have to analyze the programming content for the Service Provider B 365 only. Then an indication may be provided to Contact B 322 on Contact B's Device 314 that the checked-in content may be available for viewing via their Service Provider B 365 on a particular channel at a particular time.

Further, in our example, again as illustrated in FIG. 3C, the current location of the Contact C 332 and Contact C's Device 324 is Location C 380. Service Provider C 385 and Service Provider D 375 both provide service in the Location C 380. Hence, if additional information is not provided to the user's Service Provider A 355 regarding the service provider that provisions service to the Contact C's viewing device 324, the result of the analysis by the content check-in system 100 may lead to a broader result including, for example, the timings and the channels for the checked-in content 304 with respect to both the Service Provider C 385 and Service Provider D 375 that may be provisioning the Contact C's viewing device 324.

Having described various embodiments of the invention with respect to FIGS. 1-3C, FIG. 4 is a flow chart of a method 400 for providing content check-in according to an embodiment. The method 400 may begin at START OPERATION 405, and may proceed to OPERATION 410, where a video content item may be received by the user 302. The method 400 proceeds to OPERATION 415 where the check-in option 204 may be selected. As described above, according to an embodiment, the user 302 may be browsing for available content on a guide user interface 250 and may decide to check in a content item, which may be scheduled to be presented at a later time. A check-in option 204 may be provided as illustrated in FIG. 2A and FIG. 2B. As can be appreciated the option to check in content may also be implemented via a variety of different ways such as voice activation, a gesture input, a button on a remote, a menu option, a banner, via an alternate device, etc.

Once the user 302 initiates the content check-in option 204, the method 400 proceeds to OPERATION 420 where a list of social network contacts may be provided for the user 302 to select the contacts with whom he/she may desire to share the checked-in content as illustrated in FIG. 3A. If the content check-in option 204 is initiated for the first time, the system may provide the user 302 with the option to share his/her social network contacts with the service provider prior to the service provider being able to provide the user 302 with the list 310 of social network contacts as illustrated in FIG. 3A. As should be appreciated, the term social network contacts used herein is not limited to one or more contacts of the user 302 associated with a particular social network system or program, but is meant in a general sense to include any contacts available to the user 302 to which the user may desire to provide viewing options for a checked-in content item.

Once the user selects the social network contact(s), a check may be performed to determine if the system has additional information about the selected social network contact(s). If the system already has the additional information related to location and service provider of the selected social network contact(s), the method 400 proceeds to OPERATION 440, where the viewing options for the selected social network contact(s) may be analyzed based on the location and service provider information of the selected social network contact (s). If the additional information is not found at DECISION OPERATION 425, the method 400 proceeds to the DECISION OPERATION 425, where the user 302 may be presented with the user interface to determine if the user 302 has access to and desires to answer additional questions about the selected social network contact(s) in order to enable the system to accurately provide the selected social network contact (s) with the viewing options.

If the user 302 has access to and desires to answer additional questions about the selected social network contact(s) in order to enable the system to accurately provide the selected social network contact(s) with the viewing options, the method 400 proceeds to OPERATION 435. At OPERATION 435, the user 302 may be presented with some questions to retrieve additional location information and service provider information of the selected social network contact (s). Based on the information received from the user 302 and/or the information retrieved from the social network as a result of the user sharing the social network contacts with the service provider, the method 400 proceeds to OPERATION 440 where the viewing options may be analyzed for the selected social network contact(s).

According to an embodiment, once the social network contact(s) are selected at OPERATION 420, the method may proceed to DECISION OPERATION 430 to retrieve additional information from the user 302 so that the system may perform the analysis at OPERATION 440 with updated additional information, if so available. That is, at OPERATION 440, one or more service providers associated with the selected contact(s), a time zone associated with the selected contact(s), and availability of the checked-in content item for presentation to the selected contact(s) may be determined so that viewing options for the checked-in content item may be presented to the selected contact(s) if such options may be provided. As should be appreciated, if the checked-in content item may not be provided to the selected contact(s) based on information for the contact(s) (e.g., location, time zone, associated service provider, etc.), then no viewing option may be provided to the selected contact(s).

The method 400 proceeds to OPERATION 445 where the viewing options may be presented to the selected contact(s) 322 through any of a variety of suitable means. For example, a notification/indication of the checked-in content item and viewing options for the selected contacts may be presented via a social network system (e.g., FACEBOOK or TWITTER); the notification/indication may be electronically mailed to the selected contact(s); the notification/indication may be texted or otherwise electronically communicated to the selected contact; or the notification/indication may be made to the selected contact via his/her service provider such that the notification/indication is received on screen in a user interface such as the viewing guide illustrated in FIG. 2B, or in an on screen pop-up dialog box or other suitable user interface component. As described earlier, according to an embodiment, prior to presenting the viewing options for the checked-in content, the user's 302 service provider may communicate with the selected social network contact(s) to retrieve updated additional information about their location and service provider, in order to provide the selected social network contact(s) with more accurate viewing options.

The method ends at OPERATION 495.

Figure 5:
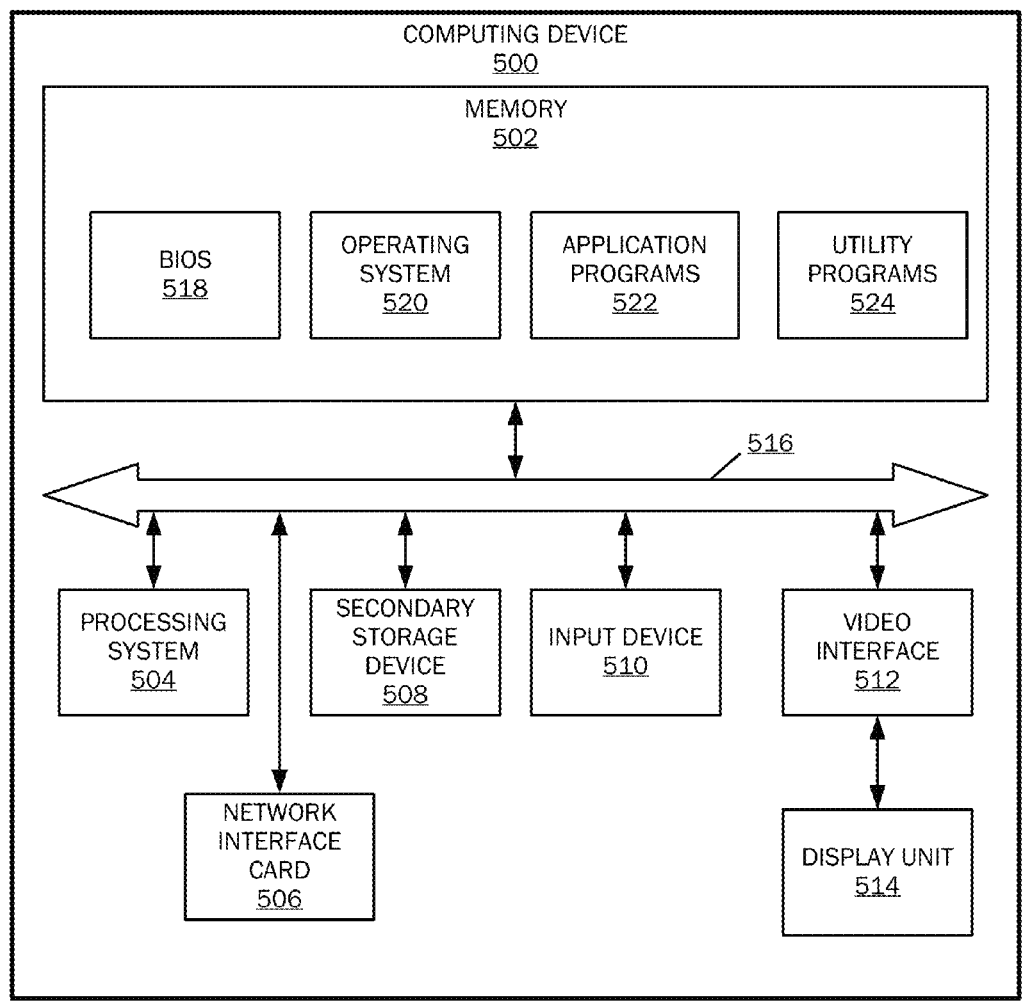
FIG. 5 is a block diagram illustrating example physical components of a computing device with which embodiments may be practiced.

FIG. 5 is a block diagram illustrating example physical components of a computing device 500 with which embodiments may be practiced. In some embodiments, one or a combination of the components of the system 100 may be implemented using one or more computing devices like the computing device 500. It should be appreciated that in other embodiments, one or a combination of the components of the system 100 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, and a display unit 514. In other embodiments, the computing device 500 may be implemented using more or fewer hardware components (e.g., a video interface, a display unit, or an input device) or in combination with other types of computer systems and program modules. The memory 502 includes one or more computer-readable storage media capable of storing data and/or computer-executable instructions. Memory 502 thus may store the computer-executable instructions that, when executed by processor 504, provide content check-in as described above with reference to FIGS. 1-4.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media includes information delivery media. Computer-executable instructions, data structures, program modules may be embodied on a communications medium. For example, communication media can include wired media, such as a wired network or direct-wired connection, and wireless media, such as acoustic, radio frequency (RF), infrared, and other wireless media.

The term computer-readable storage medium refers only to devices and articles of manufacture that store data and/or computer-executable instructions readable by a computing device. Computer-readable storage medium do not include communications media. The term computer-readable storage media encompasses volatile and nonvolatile and removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users, for example, application software to analyze the viewing options of the checked-in content. The memory 502 also stores one or more utility programs 524 that, when executed by the processing system 504, cause the computing device 500 to provide utilities to other software programs. Embodiments of the present invention may be utilized in various distributed computing environments where tasks are performed by remote processing devices that are linked through a communications network in a distributed computing environment.

FIGS. 6A-6B illustrate a suitable mobile computing environment, for example, a mobile computing device 600, a mobile phone/smartphone, a tablet device, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 622 functionality associated with the mobile computing device, or any other suitable input means. Data may be output via the device 600 via any suitable output means, including but not limited to, display on the display screen 605, audible output via an associated speaker 630 or connected earphone device, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, application software to analyze the viewing options for the checked-in content may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network. Radio functions 650 may be utilized to communicate with a wireless or Wi-Fi based positioning system to determine a device's 600 location.

FIG. 7 is a simplified block diagram illustrating a cable television services system 700 (hereafter referred to as "CATV") architecture providing an operating environment according to an embodiment. As can be appreciated, a CATV architecture is but one of various types of systems that may be utilized to provide substituted VOD content. Referring now to FIG. 7, digital and analog video programming, information content and interactive television services are provided via a hybrid fiber coax (HFC) network 155 to a television set 116 for consumption by a cable television/services system customer. As is known to those skilled in the art, HFC networks 155 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 155 allows for efficient bidirectional data flow between the client-side set-top box 118 and a server-side application server 740.

The CATV system 700 is in the form of a distributed client-server computing system for providing video and data flow across the HFC network 155 between server-side services providers (e.g., cable television/services providers) via a server-side head end 150 and a client-side customer via a client-side set-top box (STB) 118 in communication with a customer receiving device, such as the television set 116. As is understood by those skilled in the art, modern CATV systems 700 may provide a variety of services across the HFC network 155 including traditional digital and analog video programming, telephone services, high speed Internet access, video-on-demand, and information services.

On the client side of the CATV system 700, digital and analog video programming and digital and analog data are provided to the customer television set 116 via the set-top box (STB) 118. Interactive television services that allow a customer to input data to the CATV system 700 likewise are provided by the STB 118. As illustrated in FIG. 7, the STB 118 is a multipurpose computing device having a computer processor, memory, and an input/output mechanism. The input/output mechanism receives input from server-side processes via the HFC network 155 and from customers via input devices such as the remote control device 728, keyboard 730, or other computing device, such as a tablet/slate computer 114, smart phone 600, etc. The remote control device 728 and the keyboard 730 may communicate with the STB 118 via a suitable communication transport such as the infrared connection 732. The STB 118 also includes a video processor for processing and providing digital and analog video signaling to the television set 116 via a cable communication transport 734. A multi-channel tuner is provided for processing video and data to and from the STB 118 and the server-side head end system 150, described below.

The STB 118 also includes an operating system 722 for directing the functions of the STB 118 in conjunction with a variety of client applications 725. For example, if a client application 725 requires a news flash from a third-party news source to be displayed on the television 116, the operating system 722 may cause the graphics functionality and video processor of the STB 118, for example, to output the news flash to the television 116 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server and the client-side STB 118. The middleware layer 742 of the server-side application server and the middleware layer 724 of the client-side STB 118 may format data passed between the client side and server side according to the Extensible Markup Language (XML).

According to one embodiment, the set-top box 118 passes digital and analog video and data signaling to the television 116 via a one-way communication transport 734. According to other embodiments, two-way communication transports may be utilized, for example, via high definition multimedia (HDMI) ports. The STB 118 may receive video and data from the server side of the CATV system 700 via the HFC network 155 through a video/data downlink and data via a data downlink. The STB 118 may transmit data from the client side of the CATV system 700 to the server side of the CATV system 700 via the HFC network 155 via one data uplink. The video/data downlink is an "in band" downlink that allows for digital and analog video and data signaling from the server side of the CATV system 700 through the HFC network 155 to the set-top box 118 for use by the STB 118 and for distribution to the television set 116. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 155 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 740 is typically passed through the "out of band" data links. Alternatively, an "in band" data carousel may be positioned in an "in band" channel into which a data feed may be processed from the server-side application server 740 through the HFC network 155 to the client-side STB 118. Operation of data transport between components of the CATV system 700, described with reference to FIG. 7, is well known to those skilled in the art.

Referring still to FIG. 7, the head end 150 of the CATV system 700 is positioned on the server side of the CATV system and includes hardware and software systems responsible for originating and managing content for distributing through the HFC network 155 to client-side STBs 118 for presentation to customers via television sets 116. As described above, a number of services may be provided by the CATV system 700, including digital and analog video programming, interactive television services, telephone services, video-on-demand services, targeted advertising, and provision of information content.

The application server 740 is a general-purpose computing system operative to assemble and manage data sent to and received from the client-side set-top box 118 via the HFC network 155. As described above with reference to the set-top box 118, the application server 740 includes a middleware layer 742 for processing and preparing data from the head end of the CATV system 700 for receipt and use by the client-side set-top box 118. For example, the application server 740 via the middleware layer 742 may obtain data from third-party services 746 via the Internet 140 for transmitting to a customer through the HFC network 155 and the set-top-box 118. For example, content metadata of a third-party content provider service may be downloaded by the application server 740 via the Internet 140. When the application server 740 receives the downloaded content metadata, the middleware layer 742 may be utilized to format the content metadata for receipt and use by the set-top box 118. Therefore, content metadata may be sent and categorized based on the availability to the customer's program guide data.

According to one embodiment, data obtained and managed by the middleware layer 742 of the application server 740 is formatted according to the Extensible Markup Language and is passed to the set-top box 118 through the HFC network 155 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 140 for provision to customers via the HFC network 155 and the set-top box 118.

According to embodiments, the application server 740 obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700 which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

Referring still to FIG. 7, web services system 750 is illustrated between the application server 740 and the data services 760. According to embodiments, web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 766 may include information such as secure user names, subscriber profiles, subscriber IDs, and passwords utilized by customers for access to network services. As should be understood by those skilled in the art, the disparate systems 762, 764, 766, 768 may be integrated or provided in any combination of separate systems, wherein FIG. 7 shows only one example.

Embodiments of the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method comprising:
providing a video content item for display via a client application;
receiving an indication to check in the video content item via a selectable option displayed via the client application;
receiving an identification of social network contact via the client application with whom the video content item is to be shared;
analyzing viewing options for the checked-in video content item for the social network contact based on a location and a service provider of the social network contact; and
providing a notification to a social networking application of the social network contact indicating the viewing options for the checked-in video content item according to the location and the service provider of the social network contact.

2. The method of claim 1, wherein receiving the indication to check in the video content item comprises receiving the indication via one or more of:
a voice activation command;
a gesture input;
a button on a remote;
a menu option;
a selection of a banner; or
an alternate device.

3. The method of claim 1, further comprising analyzing the viewing options based on receiving via the social networking application one or more of:
the location of the social network contact; or
the service provider of the social network contact.

4. The method of claim 1, wherein prior to providing the notification to the social networking application of the social network contact with the viewing options, providing an option to the social network contact to share additional information via the social networking application on one or more of:
the location of the social network contact; and
the service provider of the social network contact.

5. The method of claim 1, wherein prior to receiving the identification of social network contact with whom the video content item is to be shared, further comprising:
receiving a selection to share the social networks contacts;
providing a list of one or more social network contacts; and
receiving a selection of a social network contact from the list.

6. The method of claim 1, wherein receiving the indication to check in the video content item comprises receiving an indication to check in one or more of:
a DVR content item;
a VOD content item;
a linear video content item; or
an Internet video content item.

7. The method of claim 1, wherein providing the notification to the social network contact with the viewing options comprises providing an indication of one or more of:
times at which the checked-in content item is available for viewing according to the location and the service provider of the social network contact; and
channels on which the checked-in content item is available for viewing according to the location and the service provider of the social network contact.

8. A system comprising:
a memory storage; and
one or more processing units coupled to the memory storage, wherein the one or more processing units are operable to:
provide a video content item for display via a client application;
receive an indication to check in the video content item via a selectable option displayed via the client application;
provide a list of social network contacts;
receive an identification of social network contact to notify via the client application;
analyze viewing options for the checked-in video content item for the social network contact based on a location and a service provider of the social network contact; and
provide a notification to a social networking application of the social network contact indicating the viewing options for the checked-in video content item according to the location and the service provider of the social network contact.

9. The system of claim 8, wherein in receiving the indication to check in the video content item, the one or more processing units are operable to receive the indication via one or more of:
a voice activation command;
a gesture input;
a button on a remote;
a menu option;
a selection of a banner; or
an alternate device.

10. The system of claim 8, wherein the one or more processing units are operable to analyze the viewing options based on receiving via the social networking application of the social network contact one or more of:
the location of the social network contact; or
the service provider of the social network contact.

11. The system of claim 8, wherein prior to providing the notification to the social networking application of the social network contact with the viewing options, the one or more processing units are operable to provide an option to the social network contact to share additional information via the social networking application on one or more of:
- the location of the social network contact; and
- the service provider of the social network contact.

12. The system of claim 8, wherein prior to providing the list of social network contacts, the one or more processing units are operable to receive a selection to share the social networks contacts via the client application.

13. The system of claim 8, wherein in receiving the indication to check in the video content item, the one or more processing units are operable to receive an indication to check in one or more of:
- a DVR content item;
- a VOD content item;
- a linear video content item; or
- an Internet video content item.

14. The system of claim 8, wherein the one or more processing units are operable to provide an indication of one or more of:
- times at which the checked in content item is available for viewing according to the location and the service provider of the social network contact; and
- channels on which the checked in content item is available for viewing according to the location and the service provider of the social network contact.

15. A computer readable medium containing computer executable instructions which when executed, perform a method comprising:
- providing a video content item for display via a client application;
- receiving an indication to check in the video content item via a selectable option displayed via the client application;
- providing a list of social network contacts;
- receiving an identification of social network contact to notify via the client application;
- analyzing viewing options for the checked-in video content item based on a location and a service provider of the social network contact of the social network contact; and
- providing a notification to a social networking application of the social network contact indicating the viewing options for the checked-in video content item according to the location and the service provider of the social network contact.

16. The computer readable medium of claim 15, wherein receiving the indication to check in the video content item comprises receiving the indication via one or more of:
- a voice activation command;
- a gesture input;
- a button on a remote;
- a menu option;
- a selection of a banner; or
- an alternate device.

17. The computer readable medium of claim 15, further comprising receiving via the social networking application one or more of:
- the location of the social network contact; or
- the service provider of the social network contact.

18. The computer readable medium of claim 15, wherein prior to providing the notification to the social networking application of the social network contact with the viewing options, providing an option to the selected social network contact to share additional information via the social networking application on one or more of:
- the location of the social network contact; and
- the service provider of the social network contact.

19. The computer readable medium of claim 15, wherein prior to providing the list of social network contacts, further comprising receiving a selection to share the social networks contacts via the client application.

20. The computer readable medium of claim 15, further comprising providing an indication of:
- times at which the checked in content item is available for viewing according to the location and the service provider of the social network contact; and
- channels on which the checked in content item is available for viewing according to the location and the service provider of the social network contact.

* * * * *